(12) United States Patent
Gregersen et al.

(10) Patent No.: US 7,830,256 B2
(45) Date of Patent: Nov. 9, 2010

(54) METHOD AND SYSTEM FOR SETUP OF, AND COMMUNICATION WITH, AN RFID MIDDLEWARE SERVER FROM AN ENTERPRISE RESOURCE PLANNING SYSTEM SERVER

(75) Inventors: Flemming Gregersen, Hilleroed (DK); Kenneth Puggaard, Frederikssund (DK); Thomas Vest, Roenne (DK)

(73) Assignee: Microsoft Corporation, Redmond, WA (US)

( * ) Notice: Subject to any disclaimer, the term of this patent is extended or adjusted under 35 U.S.C. 154(b) by 787 days.

(21) Appl. No.: 11/101,063

(22) Filed: Apr. 7, 2005

(65) Prior Publication Data

US 2006/0226981 A1 Oct. 12, 2006

(51) Int. Cl.
G08B 13/14 (2006.01)
G06Q 10/00 (2006.01)
(52) U.S. Cl. ................................ 340/572.1; 705/28
(58) Field of Classification Search ............. 340/7.24, 340/10.1, 10.3, 572.1
See application file for complete search history.

(56) References Cited

U.S. PATENT DOCUMENTS

| 2003/0227392 | A1 | 12/2003 | Ebert | |
|---|---|---|---|---|
| 2004/0138989 | A1* | 7/2004 | O'Malley et al. | 705/37 |
| 2005/0252971 | A1* | 11/2005 | Howarth et al. | 235/451 |
| 2006/0047464 | A1* | 3/2006 | Kumar et al. | 702/122 |

FOREIGN PATENT DOCUMENTS

WO WO 02/082363 A1 10/2002

OTHER PUBLICATIONS

"Microsoft Business Solutions—Axapta" Aug. 1, 2003.
"Microsoft Business Solutions—Axapta 3.0 Quick Reference Guide", 2004.
Search Report and Written Opinion dated Jul. 1, 2008 from related International Application No. PCT/US06/09159, filed Mar. 14, 2006.
China—First Official Action, Oct. 23, 2009.
Russian Official Action dated Apr. 6, 2010, in related case Serial No. 2007137061 and comments in English.
EPO Communication dated May 20, 2010 in European Patent Appln. No. 06 738 241.6.
Supplemental European Search Report dated May 20, 2010 in European Patent Appln. No. 06 738 241.6.
Young-II Kim et al.; "Study of RFID Middleware Framework for Ubiquitous Computing Environment" Advance Communication Technology, 2005, the 7th Int'l Onal Conference on Phoenix Park, Korea. Feb. 21-23, 2005. pp. 825-830.

(Continued)

Primary Examiner—F. Ryan Zeender
Assistant Examiner—Fahd A Obeid
(74) Attorney, Agent, or Firm—Westman, Champlin & Kelly, PA

(57) ABSTRACT

A method of configuring a Radio Frequency Identification (RFID) middleware server is provided. The method includes calling a server form, using an Enterprise Resource Planning (ERP) system, from an ERP server. The method also includes identifying at least one RFID middleware server using the server form, and configuring one or more processes, using the server form, to run on the at least one identified RFID server. The one or more configured processes are transmitted from the ERP server to the RFID middleware server in order to configure the RFID middleware server.

15 Claims, 9 Drawing Sheets

OTHER PUBLICATIONS

Bornhovd, C. et al.; "Integrating Smart Items with Business Processes An Experience Report," Jan. 3, 2005, pp. 227C-227C.

Xiao, Henry. "Middleware and its Application Research Survey," Mar. 30, 2005.

IPEA/409 dated Oct. 21, 2008 for PCT/US2006/009159, filed Mar. 14, 2006.

Notice of Allowance for Chinese Patent Application No. 2006800006723.6, dated Jun. 4, 2010.

* cited by examiner

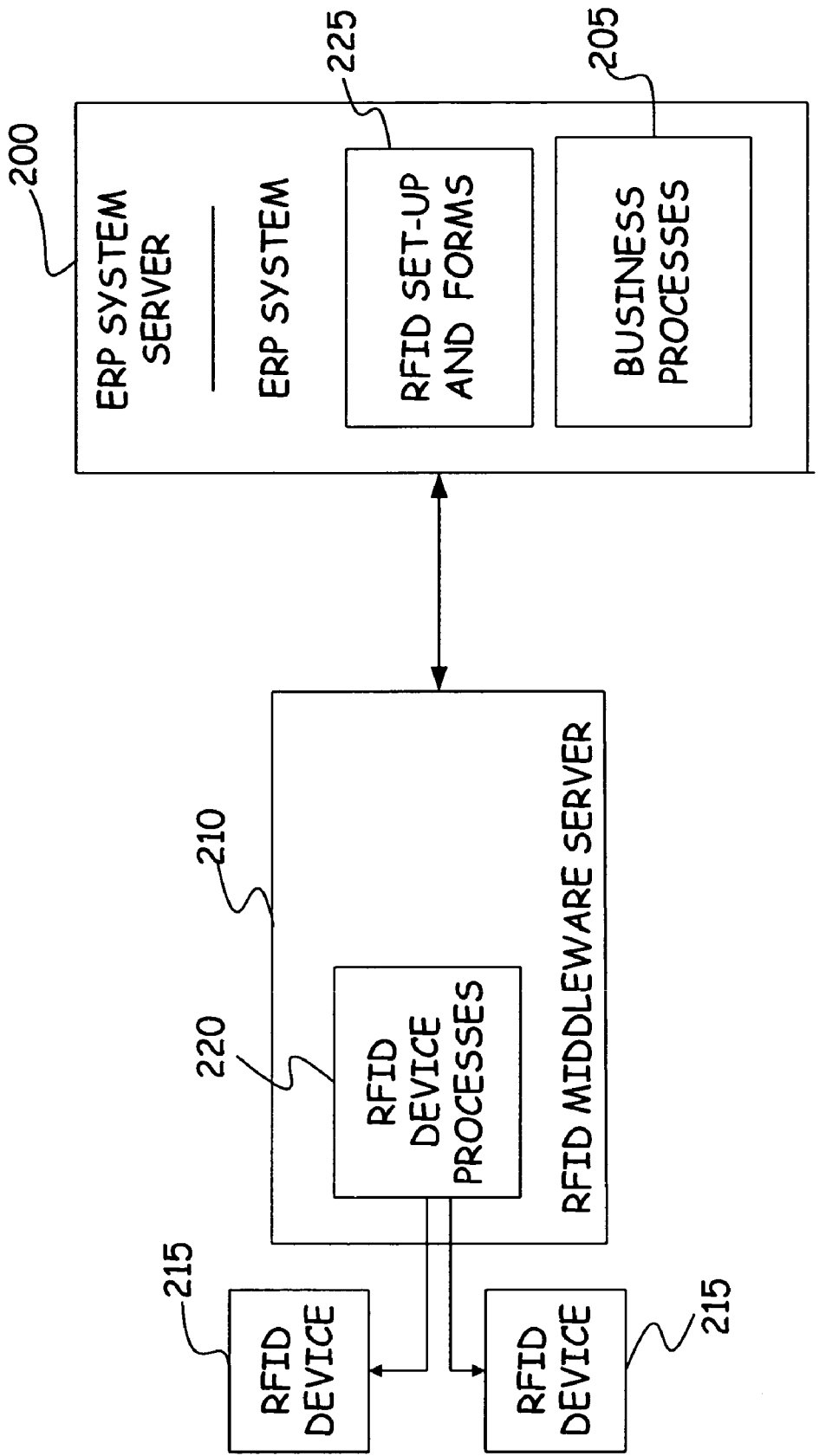

METHOD AND SYSTEM FOR SETUP OF, AND COMMUNICATION WITH, AN RFID MIDDLEWARE SERVER FROM AN ENTERPRISE RESOURCE PLANNING SYSTEM SERVER

BACKGROUND OF THE INVENTION

The present invention relates to Enterprise Resource Planning (ERP) systems. In particular, the present invention relates to methods and systems for interfacing Radio Frequency Identification (RFID) middleware servers with ERP system servers.

Enterprise resource planning (or ERP) is a phrase used to describe a broad set of activities supported by multi-module application software that helps a manufacturer or other business manage the important parts of its business, including product planning, parts purchasing, maintaining inventories, order tracking, interacting with suppliers, providing customer service, finance, human resources, etc. Often, an ERP system uses or is integrated with a relational database system. An example of an ERP system is Microsoft® Business Solutions-Axapta®. Axapta provides functionality to support many needs of a business, for example including: manufacturing; distribution, supply chain management, project management, financial management, human resource management, business analysis, enterprise portal, commerce gateway, etc.

There is an ongoing effort to introduce transmitters, such as RFID tags, into consumer goods. In particular, RFID tags are being used to identify products. An RFID tag is energized when it is placed in the proximity of an RFID tag reader. This causes circuitry within the RFID tag to transmit digital data which is received by the tag reader and stored in memory. The data can be used to identify the goods associated with the RFID tag. RFID tags can be placed on the individual goods themselves, and/or they can be placed on pallets or containers used to ship the goods. Ideally, RFID tags can be used to assist in automating the inventory and supply chain processes.

With a wide range of capabilities, RFID tags are a growing area in tracking technology. Unlike barcodes, RFID tags can be read through thick packaging and are unaffected by moisture and heat making them highly effective in manufacturing and distribution environments. RFID tags enable automatic identification with no physical contact. Depending on the specific type of RFID tag employed, the read range extends from a few inches to hundreds of feet.

In general terms, RFID is a means of identifying an object using a radio frequency transmission, typically 125 kHz, 13.56 MHz or 800-900 MHz. RFID has been extensively used in applications such as toll collection, access control, ticketing, and car immobilization devices (also called immobilizers). In recent years, the technology has received increased attention due to a confluence of actions including technology advancement, heightened security concerns, supply chain automation, and a continuing emphasis on cost control within industrial systems.

The AIDC (Automatic Identification Data Capture) industry is moving rapidly towards the use of RFID in a number of high-value and high-volume market segments. The primary benefit of RFID tags over barcodes is their ease of use and reliability. RFID tags can be read or written at distances up to several feet, while in motion, in any orientation, regardless of dirt or smudges, and through intervening objects. Perhaps most significant is the fact that many RFID tags can be read at once automatically, while barcodes have to be scanned manually, one by one.

An RFID tag will only communicate when it is in range of a read/write device (a transceiver, a transmitter/receiver, or a reader) and can be accessed at anytime. RFID tags are durable and have a long life span, no battery requirement with most tag types, and large data memory capacity. RFID tags are available in a variety of different shapes and sizes.

In construction an RFID tag has a microchip attached to an antenna. RFID tags are developed using a frequency according to the needs of the system including read range and the environment in which the tag will be read. Tags are either active or passive. Active RFID tags are powered by an internal battery and are typically read/write devices. Active RFID tags are more expensive and larger than passive RFID tags. However, they are also more powerful and have a greater read range. Passive RFID tags are powered by the field generated by the reader. Passive tags are typically much lighter than active tags, less expensive, and offer a virtually unlimited operational lifetime. However they have shorter read ranges and require a higher-powered reader than active tags.

An RFID reader, usually connected to a personal computer, serves the same purpose as a barcode scanner. It can also be battery-powered to allow mobile transactions with RFID tags. The RFID reader handles the communication between the information system and the RFID tag. An RFID antenna connected to the RFID reader, can be of various sizes and structures, depending on the communication distance required for a given system's performance. The antenna activates the RFID tag and transfers data by emitting wireless pulses.

While RFID tags can be used to collect additional data related to a supply chain process, integrating RFID tag readers into existing ERP systems can be difficult. Using RFID tags to enhance the efficiency of business processes and integrate the information collected from the tags directly into the supply chain and inventory processes of business software requires a middleware process such as an RFID server to handle the collection and transmission of information to the business software. As RFID middleware servers are typically not setup to function with specific business processes of particular ERP systems, initialization and setup would be required. However, RFID middleware servers frequently do not have the user interfaces required to perform such setup. Further, since the middleware server and the ERP system software can be programmed using different programming languages, communication between the two can be problematic.

SUMMARY OF THE INVENTION

Using RFID tags to enhance the efficiency of business processes and integrate the information collected from the tags directly into the supply chain and inventory processes of business software requires a middleware process such as an RFID server to handle the collection and transmission of information to the business software of an Enterprise Resource Planning (ERP) system. The middleware process and RFID server has to be initialized and set-up. The present invention facilitates this set-up from the business software of the ERP. The invention provides processes, forms, schemas, etc. to provide for the initialization and setup of the middleware process.

A method of configuring a Radio Frequency Identification (RFID) middleware server is provided. The method includes calling a server form, using an Enterprise Resource Planning (ERP) system, from an ERP server. The method also includes identifying at least one RFID middleware server using the server form, and configuring one or more processes, using the server form, to run on the at least one identified RFID server. The one or more configured processes are transmitted from the ERP server to the RFID middleware server in order to configure the RFID middleware server.

Other features and benefits that characterize embodiments of the present invention will be apparent upon reading the following detailed description and review of the associated drawings.

BRIEF DESCRIPTION OF THE DRAWINGS

FIG. 2 is a block diagram illustrating an ERP system server and an RFID middleware server where the present invention can be implemented.

FIGS. 3-1 and 3-2 are screen shots illustrating an embodiment of a server form used to set-up an RFID server from an ERP server.

FIGS. 4-1 through 4-3 are screen shots illustrating an embodiment of a devices form used to set-up devices, coupled to the RFID server, from the ERP server.

FIGS. 5-1 through 5-4 are screen shots illustrating an embodiment of a processes form used to set-up processes, on the RFID server, from the ERP server.

DETAILED DESCRIPTION OF ILLUSTRATIVE EMBODIMENTS

Radio frequency identification (RFID) is a technology which can aid manufacturers and distributors to gain improved visibility into their supply chain, by increasing the number of data capture points in their supply chain. The aim is to put RFID tags on pallets, cases or items so they can be uniquely identified and tracked in the supply chain. The tracking can be done by collecting the data about when a unique pallet/case/item was registered at a specific location.

Using RFID tags to enhance the efficiency of business processes and integrate the information collected from the tags directly into the supply chain and inventory processes of business software requires a middleware process such as on an RFID middleware server to handle the collection and transmission of information to the business software on an enterprise resource planning (ERP) system server, such as an Axapta® server. The middleware processes on the RFID middleware server would have to be initialized and setup from the business software of the ERP system. The invention provides processes, forms, schemas, etc. to provide for the initialization and setup of the middleware process on the RFID middleware server, as well as communication between the ERP server and the RFID middleware server.

Figure 1:
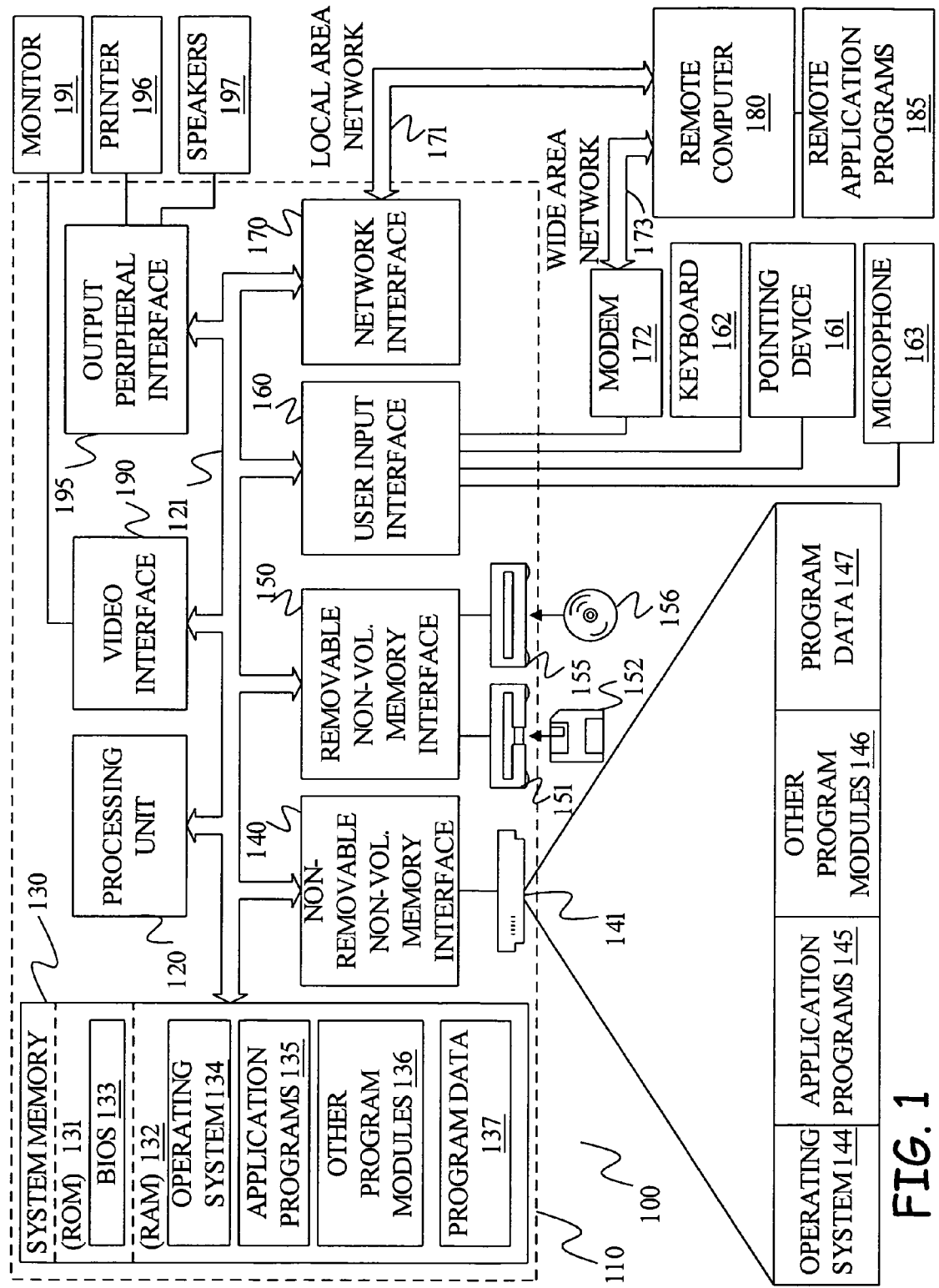
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figures 1, 3:
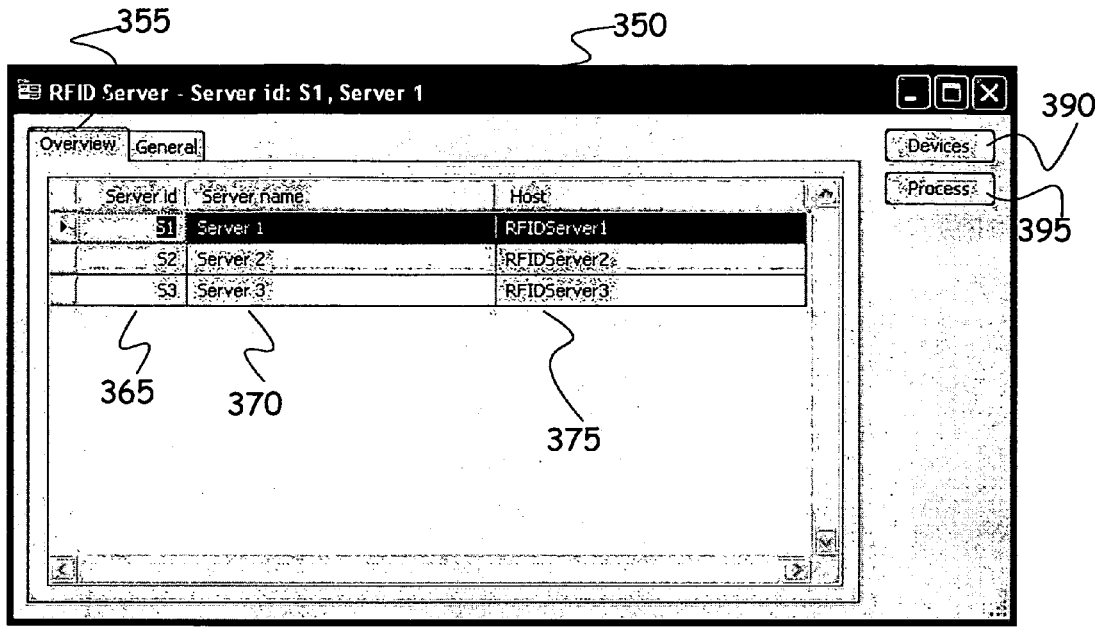
Figures 2, 3:
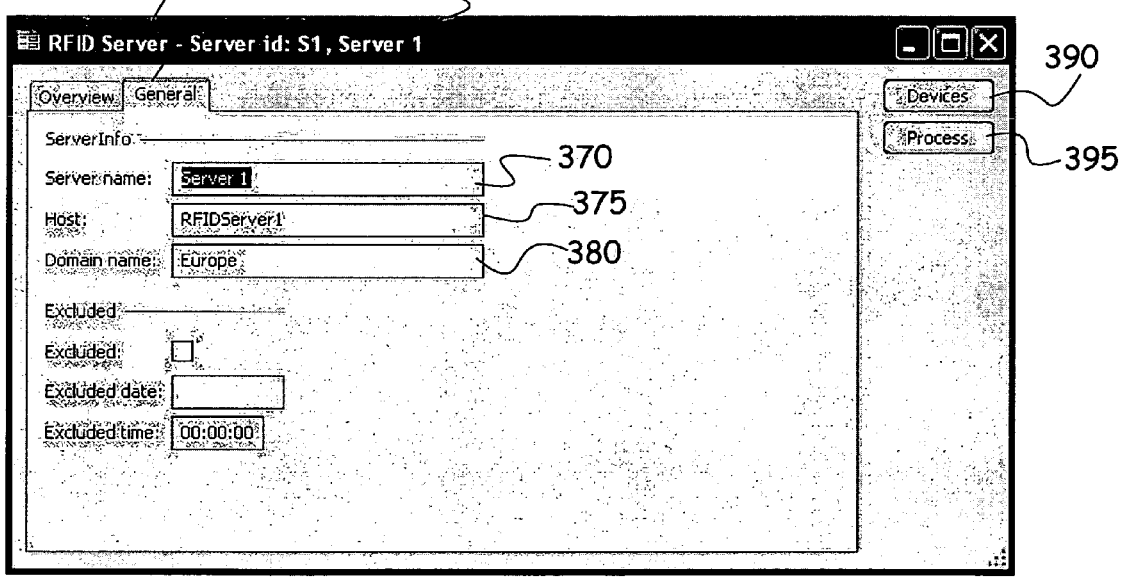

Referring now to FIG. 2, shown in block diagram is an environment in which the methods of the present invention can be implemented. In FIG. 2, ERP system server 200 represents one or more servers or computing systems on which ERP system modules (business processes) 205 are run to implement ERP functions for a company or user. An RFID middleware server 210 (hereafter RFID server 210) couples ERP system server 200 to one or more RFID devices 215. RFID devices 215 can be, for example, RFID readers which read RFID tags and/or RFID writers which write RFID tags. RFID server 210 interfaces with RFID devices 215 to control processes 220, such as read and write processes. In accordance with embodiments of the present invention, methods of setting up RFID server 210, devices 215 and processes 220 are provided.

Set-up of RFID server 210 and related devices 215 and processes 220 for use with a particular ERP system can present a number of difficulties. For instance, it would be common for RFID server 220 to not be programmed with graphical user interfaces (GUIs) configured for set-up of particular processes for the ERP system, rendering set-up more difficult. The present invention provides processes, forms, schemas, etc. to provide for the initialization and setup of the middleware process. These are illustrated generically in FIG. 2 at 225. A form in this context, is a window, a dialog, a page, or another UI element for viewing and/or entering data. In addition to a GUI, forms include form logic which maps, manipulates or otherwise acts upon or in response to data entered into the form. Further details of these processes, forms, etc. for set-up of RFID server 210, RFID processes 220 and/or devices 215 are provided in the following description.

RFID server 210 is set-up within the ERP system (i.e., on ERP server 200) using a server form 350 (shown in FIGS. 3-1 and 3-2) which can be called by an administrator or other authorized user of the ERP system. FIGS. 3-1 and 3-2 respectively illustrate "Overview" tab 355 and "General" tab 360 of server form 350. Server form 350 allows the user to identify one or more servers (such as RFID server 210), giving it an ID 365, a name 370, a host (machine) 375, and a domain name 380 indicative of where it is located. Server form 350 also includes "Devices" GUI control element or button 390 and "Process" GUI control element or button 395 which, when clicked upon by the user, call up device and process forms as described further below.

When the server 210 is set-up, the devices already known (through auto recovery) to the server are shown in a devices form 400 shown in FIGS. 4-1, 4-2 and 4-3. As noted previously, devices form 400 can be viewed from server form 350 using devices button 390. Devices form 400 allows viewing of "Overview" tab 405, "General" tab 410 and "Communication" tab 415. Devices not found through "Auto recovery" can be manually created, as new entries in the device form 400. The properties of the individual devices can then be set using "Properties" button 420 on devices form 400. The properties can be copied from one device to another device using the "Copy properties" button 422 shown in FIG. 4-1. The "Wizard" button 424 can be used to guide the user through the manual creation process, including a series of steps which, in a logical way, makes sure that the user enters all needed information for creating the device. In order to ensure chronological reads, it is possible to exclude the individual device or the whole server.

Figures 1, 4:
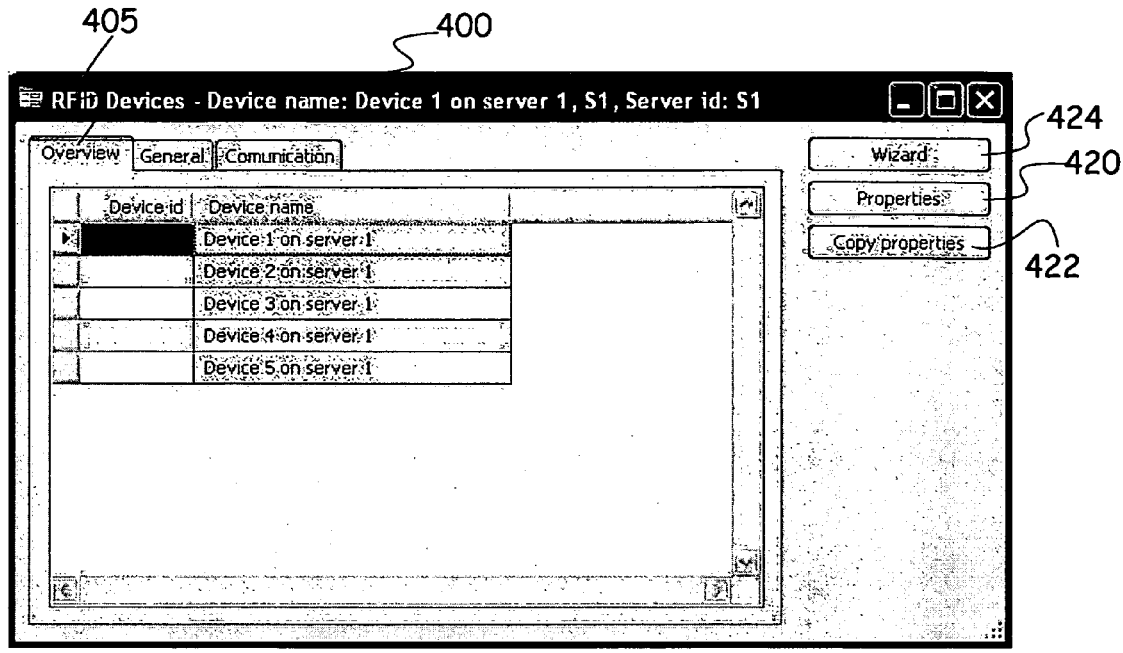
Figures 2, 4:
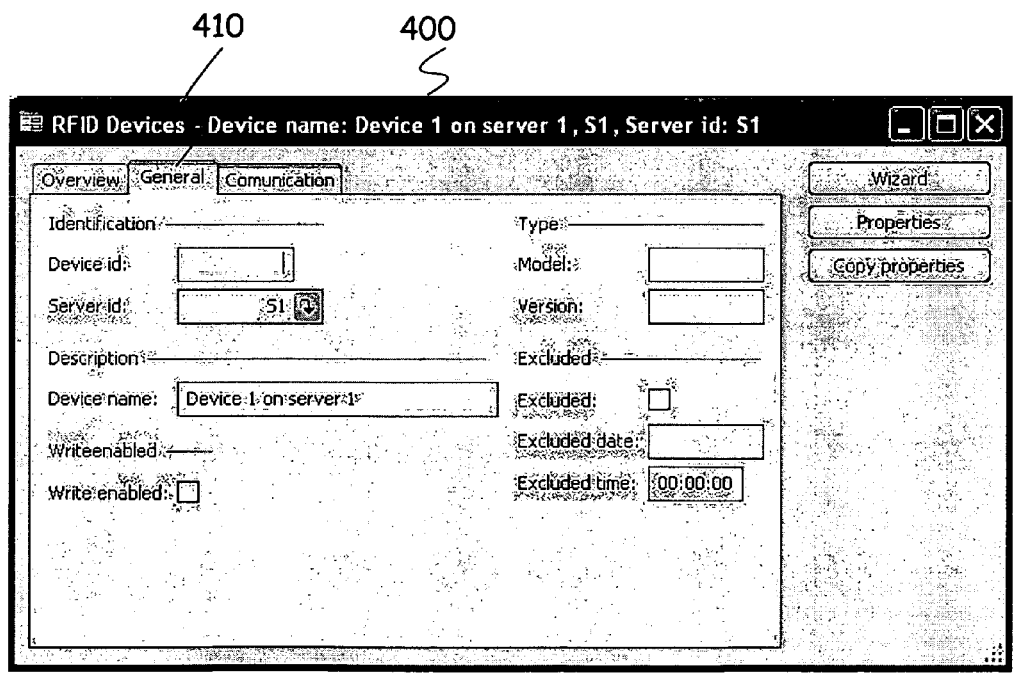
Figures 3, 4:
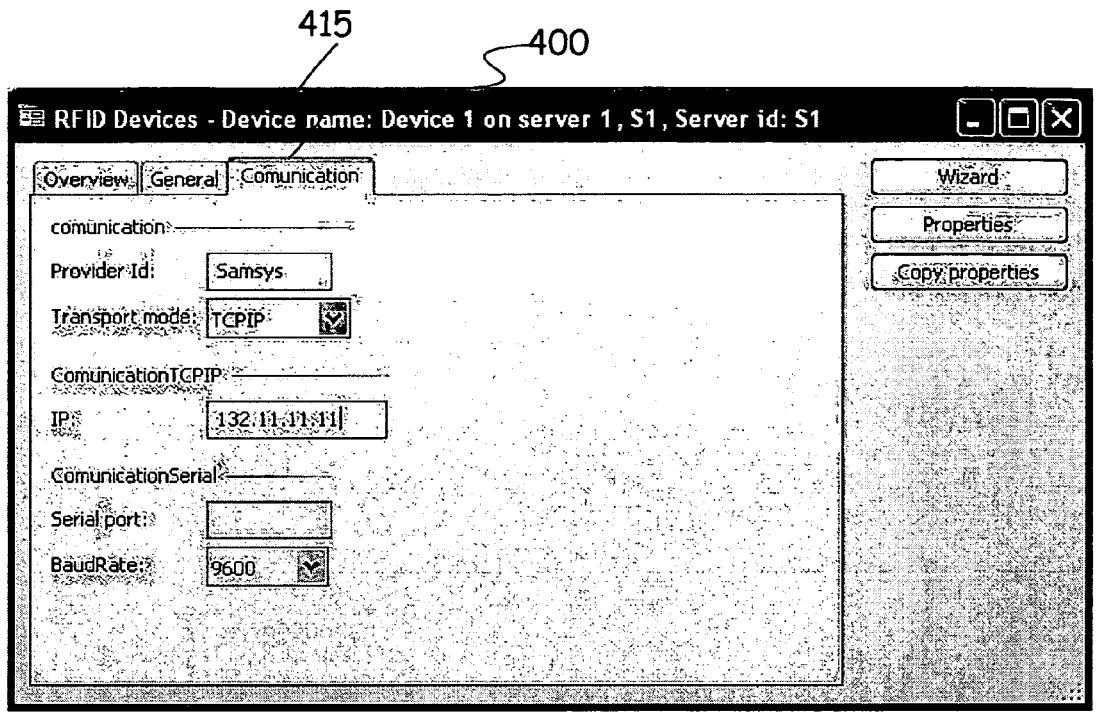
Figures 1, 5:
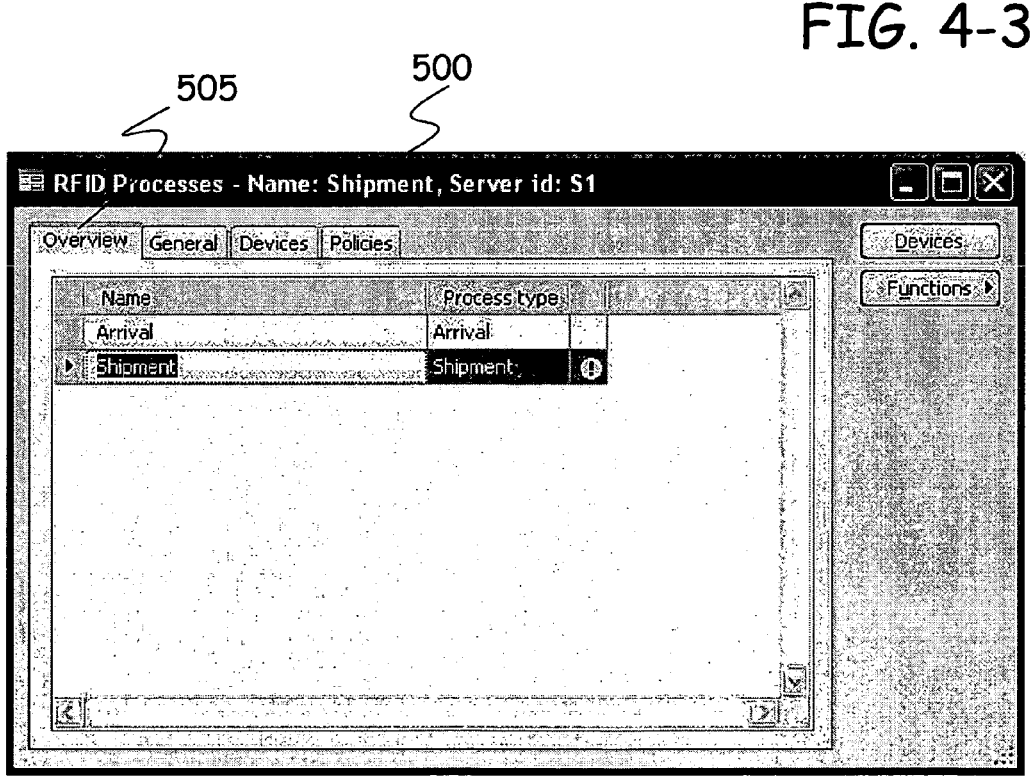
Figures 2, 5:
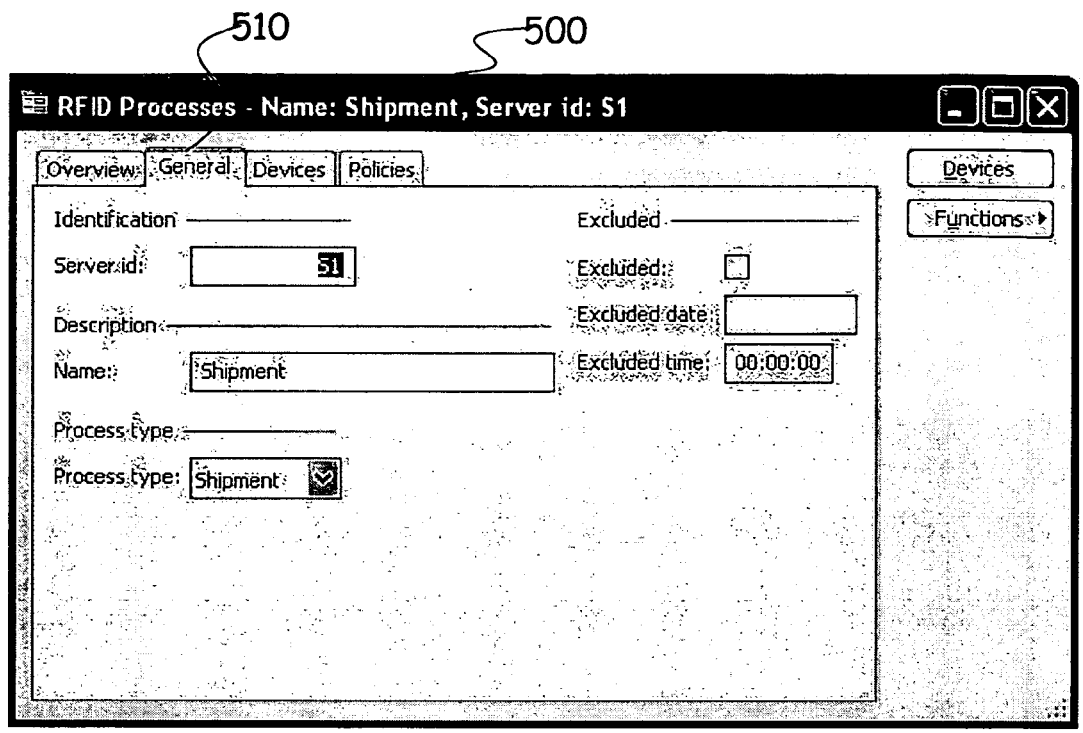
Figures 3, 5:
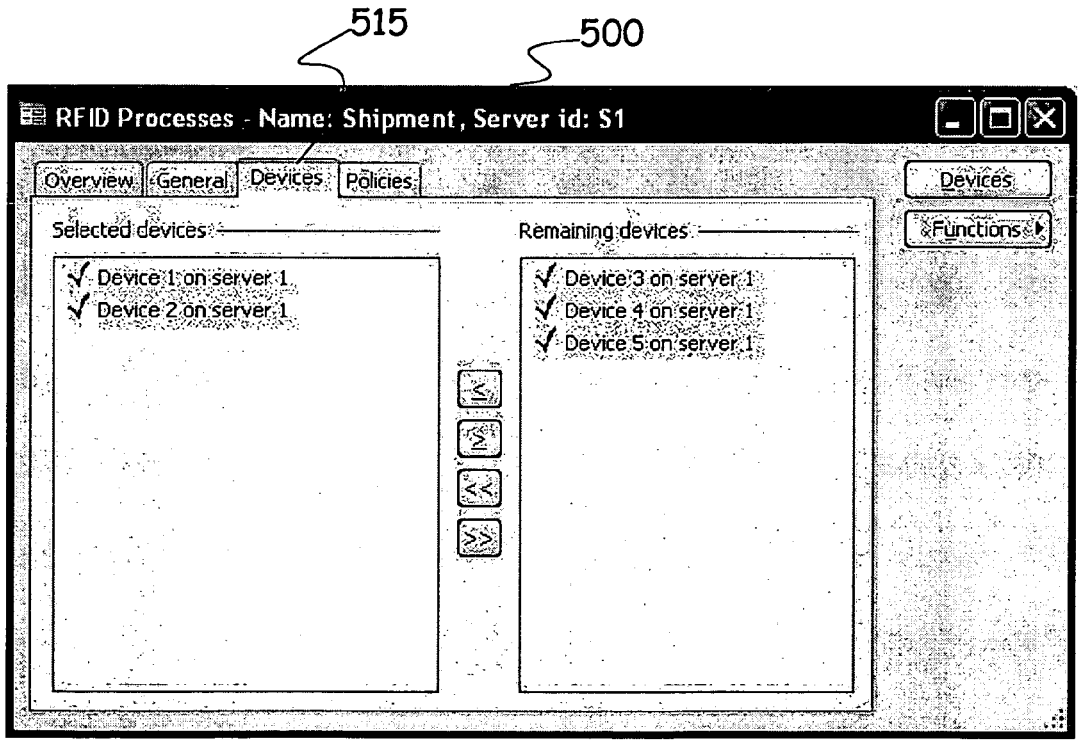
Figures 4, 5:
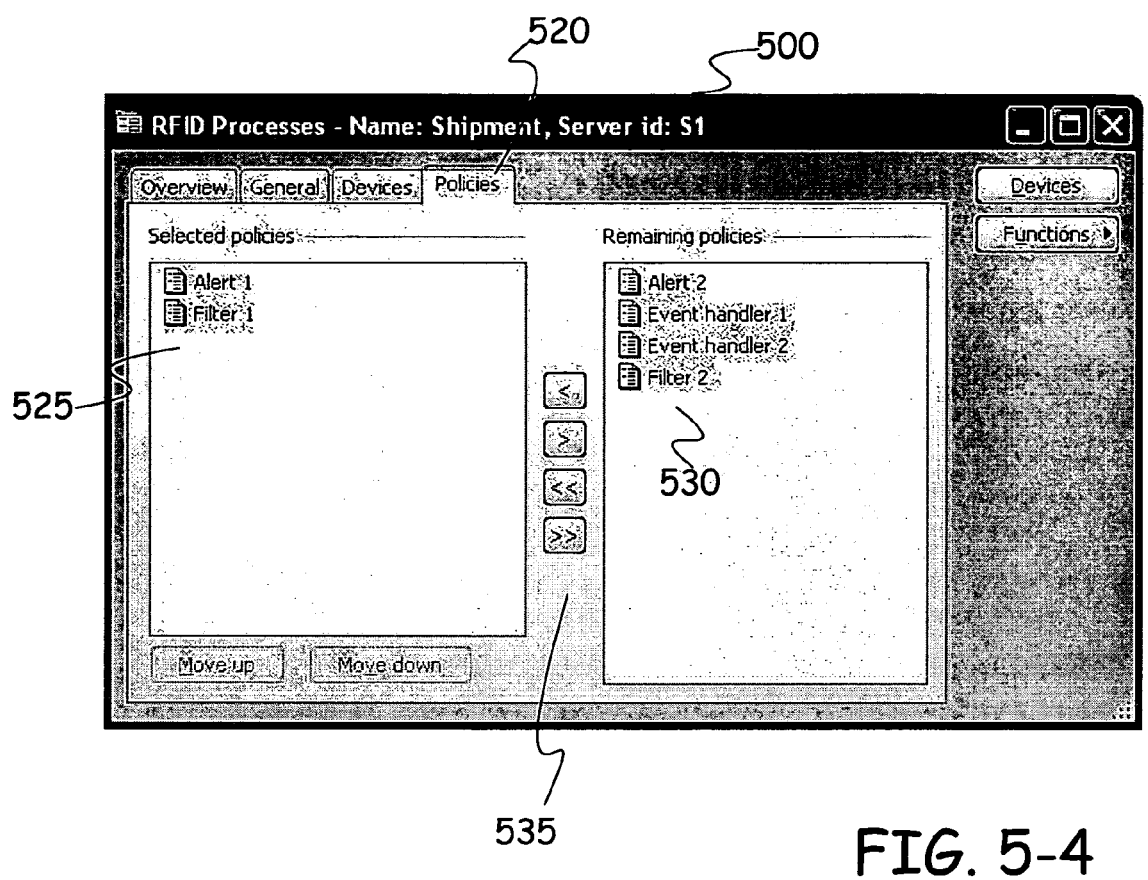

To set-up a process 220 on RFID server 210, process form 500 (shown in FIGS. 5-1 through 5-4) can be called using button 395 on server form 350. FIGS. 5-1 through 5-4 shown "Overview" tab 505, "General" tab 510, "Devices" tab 515, and "Policies" tab 520, respectively. When the process form is opened, the RFID server 210 is queried by the ERP server 200, then the RFID server will return the processes defined back to ERP server 200. The returned data is stored in tables in the ERP system (for example, Axapta tables). The tables are deleted or erased again when the form 500 is closed. This is done to ensure no data conflicts with the RFID server arise. During the setup of the process 220, the devices 215 are assigned to the process using tab 515 of form 500.

There are two types of processes that are supported, arrival processes and shipment processes. In FIG. 5-4, the policies for the process are selected. On the left side the selected policies 525 are shown. On the right side, all available policies 530 defined on the RFID server are displayed. GUI control buttons 535 are used to move available policies 530 to selected policies 525 (i.e., to select policies), and/or to deselect policies. Policies are used to define how the device is supposed to act in specific scenarios. The policies cannot be created from within the ERP system, but are created directly on the RFID server.

Figure 6:
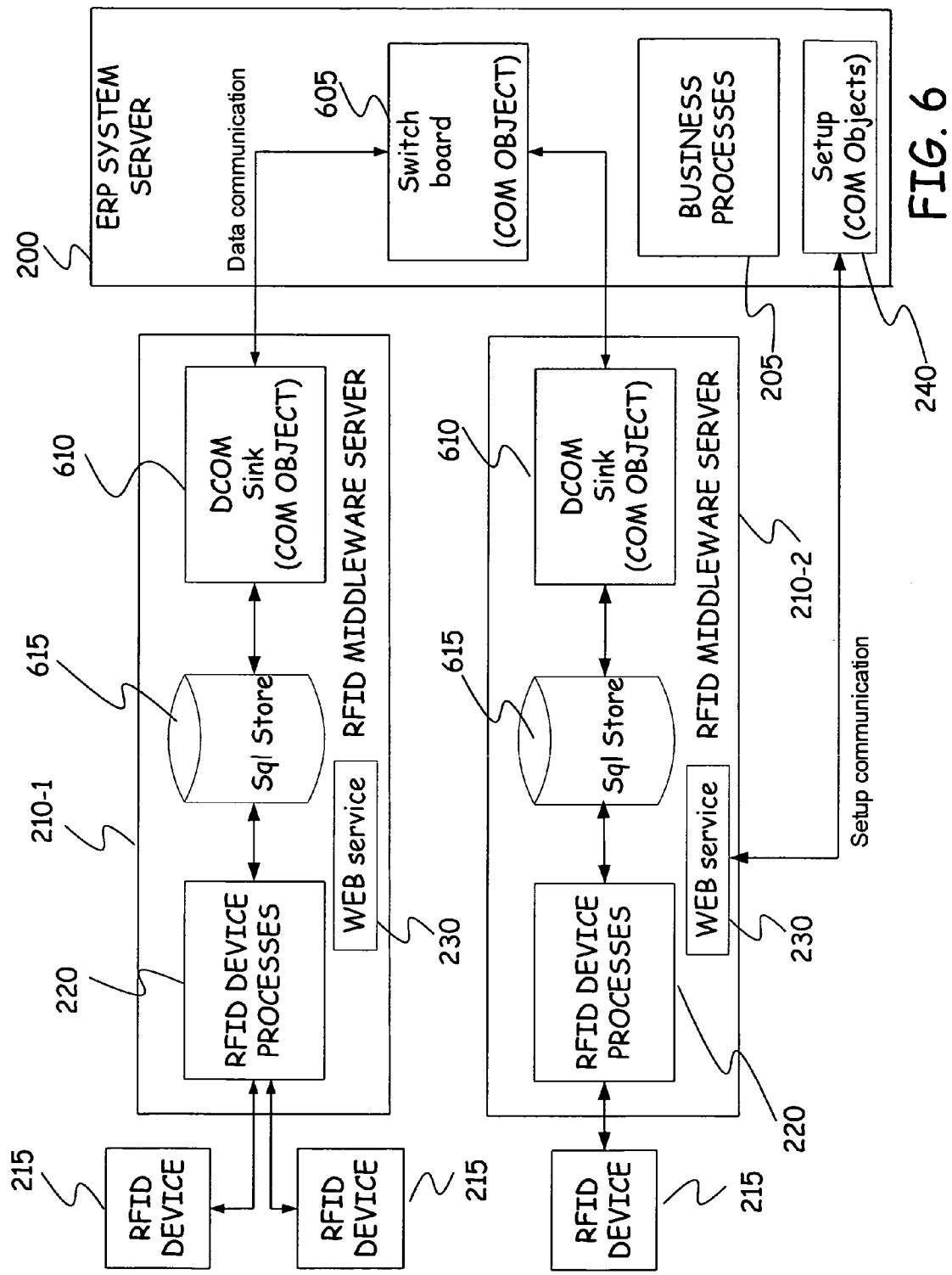
FIG. 6 is a block diagram illustrating COM object communication between the ERP system server and the RFID servers.

The final step of setting up the processes is to apply the process. When the process is applied to the RFID server, the process is built by a dedicated Component Object Model (COM) object 240 (shown in FIG. 6) and the result is stored in the RFID server via one web service 230 (shown in FIG. 6) on the RFID server. Switchboard 605 is only used for collecting tag data, and not for set-up. FIG. 6 is described in greater detail below. If the process is already running on the RFID server, the process will be paused. The process is started again when the new settings are applied.

Referring now to FIG. 6, shown in block diagram is the ERP system server 200, two RFID servers 210-1 and 210-2, and multiple RFID devices 215. Each RFID server 210 is configured to execute multiple RFID processes 220 and the set-up of the processes are accomplished as described above. As is illustrated in FIG. 6, the communication between ERP server 200 and RFID servers 210, for set-up of the processes, is implemented using COM object 240 residing on server 200 (i.e., residing in the ERP system) and WEB service 230 on each of servers 210. A second COM object residing in the ERP system is illustrated as switchboard 605 is used to collect RFID tag data. The COM objects residing on RFID servers 210, which along with COM object 605 are used to collect RFID tag data, are illustrated as DCOM Sink 610, representing the function of sinking data from Sequential Query Language (SQL) databases 615 residing on the respective servers 210, with databases on the ERP server.

In accordance with embodiments of the present invention, COM objects are used for communication between the ERP system server 200 and RFID servers 210. The use of COM objects for set-up and communication between an ERP system and an RFID middleware server introduces a standardized communication technique to an environment where hard coding or complicated software patches would otherwise typically be required. This is a significant advantage in the area of RFID server-ERP server integration, where the ERP system is typically programmed using a first (and frequently proprietary) programming language, and the RFID server is programmed using a second programming language.

In operation, when an RFID tag is scanned by an RFID reader (one of devices 215), the encoded tag information is received by the RFID server 210 in accordance with the corresponding RFID process(es) 220. The RFID server then stores the RFID tag information in the Sql Store or database 615. When the ERP is ready for this data (and other data stored by the RFID servers), it calls each RFID server 210 that it has registered and asks for the data that is new since the last call. In the set-up processes previously completed, these data have already been associated with a process. The call from the ERP system to the RFID server, as well as the resulting transfer of the RFID tag information from database 615 to the ERP system, is accomplished through COM objects 605 and 610. With the data now residing within the ERP, it can start a dedicated business process 205 associated with this process 220 which has been deployed to the RFID server. A common class for generating and splitting EPC numbers (read from the RFID tags) into its components is used. This enables the ERP to both decrypt EPC numbers (i.e., in tag read processes), and generate EPC numbers (i.e., in tag write processes).

Figure 7:
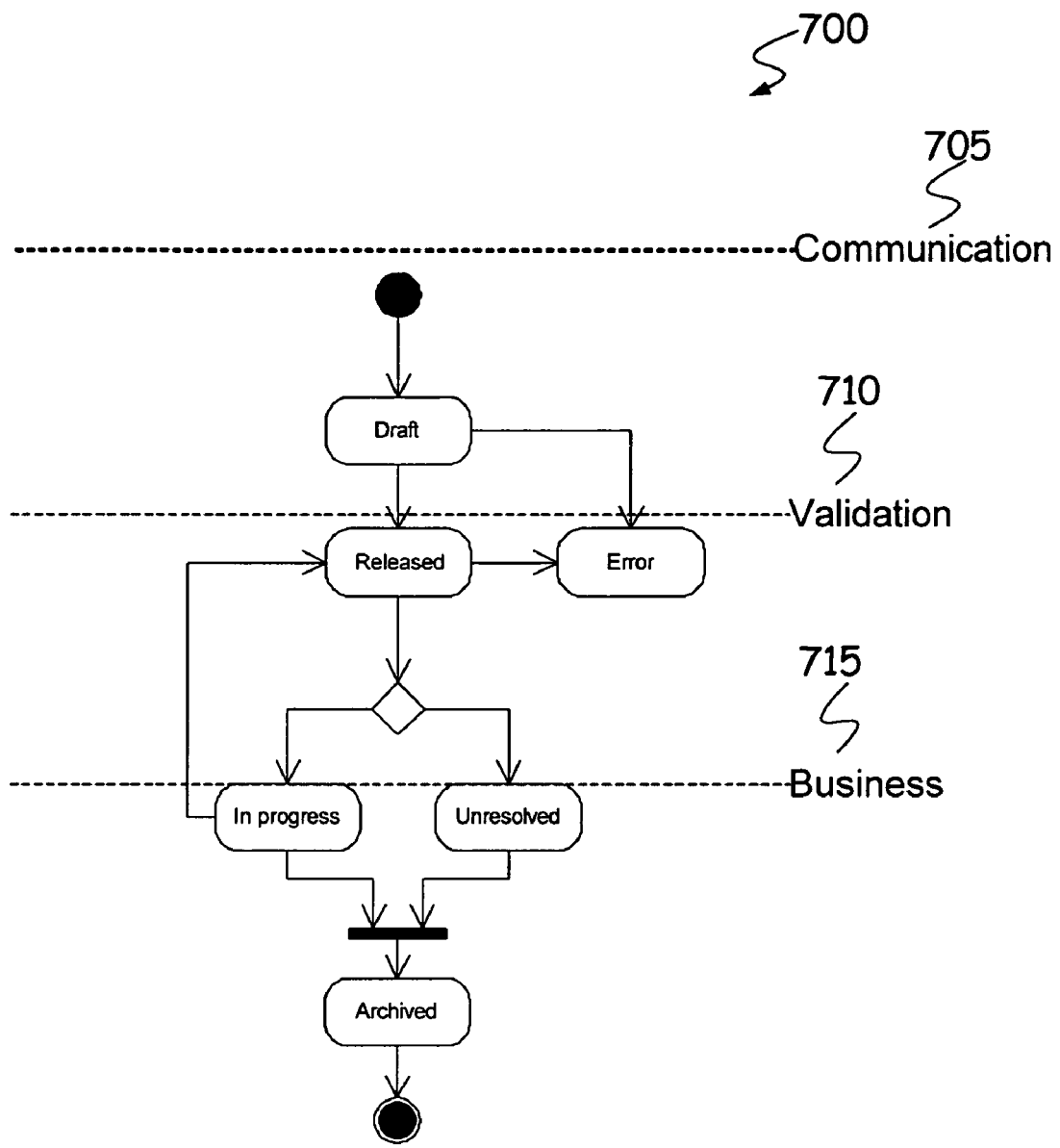
FIG. 7 is a diagrammatic illustration of three processes associated with retrieved data from an RFID tag.

In an example embodiment, the communication by the ERP server 200 with an RFID server 210 is in three batch processes that are run from the ERP batch journal. The three processes are: Communication 705, Validation 710 and Business process 715. These three batch processes are illustrated diagrammatically in flow diagram 700 shown in FIG. 7. The Communication process 705 takes care of the actual communication calling the RFID server and storing the data in the ERP system as raw data. The transactions are considered to be in "Draft" mode at this point, as it is possible that the data is erroneous (for example as a result of a pallet of items mistakenly delivered to the wrong purchaser). The Validation batch process 710 validates and enriches the data by splitting the tag information into separate fields and adds additional information from the ERP. If the validation is true, the transactions are set to "Released" status, and if the validation fails, the transactions are set to "Error" status.

In the third batch process, Business process 715, the validation records are prepared and the appropriate business processes 205 are started in the ERP. If a transaction is matched with a business process, the transaction is put into an "In progress" state. When the business process ends correctly, the transaction is set to "Archived" for storage. If the business process fails, the transaction can either remain as "In progress" or return to "Released".

Although the present invention has been described with reference to particular embodiments, workers skilled in the art will recognize that changes may be made in form and detail without departing from the spirit and scope of the invention.

What is claimed is:

1. A computer-implemented method of managing an ERP (Enterprise Resource Planning) server computer and a Radio Frequency Identification (RFID) middleware server computer so as to configure the RFID middleware server for interaction that includes interaction with RFID devices with which the RFID middleware server is configured to interact, the method comprising:

using the ERP server computer providing an ERP system to call a server form stored on the ERP server computer, the server form providing an ERP server computer based graphical user interface that receives data that identifies and configures the RFID middleware server computer, and the server form having form logic that acts in response to the data received by the graphical user interface provided by the form;

using the Enterprise Resource Planning (ERP) server computer to call a device form stored on the ERP server computer, the device form providing an ERP server computer based graphical user interface that receives data that identifies and sets properties of said RFID devices with which the RFID middleware server computer is configured to interact;

transmitting said data that identifies and sets properties of the RFID devices to the middleware server computer in order to configure the RFID middleware server computer to interact with said RFID devices so as to be consistent with the data that identifies and sets properties of the RFID devices, wherein transmitting said data that identifies and sets properties of the RFID devices comprises transmitting from the ERP server computer to the RFID middleware server computer using a first Component Object Model (COM) object on the ERP server computer;

using the Enterprise Resource Planning (ERP) server computer providing the ERP system to call a process form stored on the ERP server computer, the process form providing an ERP server computer based graphical user interface that receives data that identifies and sets properties of RFID processes; and transmitting said data that identifies and sets properties of the RFID processes to the middleware server computer in order to configure the RFID middleware server computer to implement RFID processes consistent with the data that identifies and sets properties of the RFID processes.

2. The method of claim 1, and further comprising copying the properties of the RFID devices from one identified RFID device to another identified RFID device using the device form.

3. A computer readable storage medium containing computer executable instructions that, when executed by a computer processor, cause a computer to implement a method for configuring a Radio Frequency Identification (RFID) middleware server, the method comprising:

providing a server form, residing on an Enterprise Resource Planning (ERP) server, wherein the server form provides an ERP server based graphical user interface, the graphical user interface receiving data and the server form including form logic that acts in response to the received data;

identifying the RFID middleware server using the server form residing on the ERP server;

providing a device form, residing on the Enterprise Resource Planning server, wherein the device form provides an ERP server based graphical user interface that receives data that sets a collection of properties of RFID devices with which the RFID middleware server is configured to interact;

transmitting the data that sets the collection of properties of RFID devices to the RFID middleware server in order to configure the RFID middleware server to interact with the RFID devices so as to be consistent with the data that sets the collection of properties of RFID devices;

providing a process form, residing on the Enterprise Resource Planning server, wherein the process form provides an ERP server based graphical user interface that receives data that sets a collection of properties of RFID processes; and transmitting the data that sets the collection of properties to the RFID middleware server so in order to configure the RFID middleware server to implement RFID processes consistent with the data that sets the collection of properties of RFID processes.

4. The computer storage medium of claim 3, wherein transmitting said data that sets the collection of properties of. RFID devices comprises transmitting from the ERP server to the RFID middleware server using a first Component Object Model (COM) object on the ERP server and a second COM object on the RFID middleware server.

5. The computer storage medium of claim 3, wherein the method further comprises selecting one or more of the RFID devices for the one or more of the RFID processes using the process form.

6. The computer storage medium of claim 3, wherein the method further comprises:

identifying RFID devices, coupled to the RFID middleware server, using the device form.

7. The computer storage medium of claim 3, wherein the method further comprises setting properties of the RFID devices using the device form.

8. The computer storage medium of claim 3, wherein the method further comprises copying the properties of the RFID devices from one identified RFID device to another identified RFID device using the device form.

9. An integrated Radio Frequency Identification (RFID) and Enterprise Resource Planning (ERP) system, comprising:

an RFID middleware server;

an ERP server, interfaced with the RFID middleware server using Component Object Model (COM) objects on each of the RFID middleware server and the ERP server, wherein the ERP server performs a method comprising:

providing a server form, residing on the ERP server, that provides an ERP server based graphical user interface that receives data to configure the RFID middleware server, wherein the server form includes form logic that acts in response to the received data;

providing a device form, residing on the ERP server, that provides an ERP server based graphical user interface that receives data that sets a collection of properties of RFID devices with which the RFID middleware server is configured to interact;

transmitting to the RFID middleware server the data received by the graphical user interface provided by the device form, wherein transmitting comprises transmitting so as to configured the RFID middleware server to interact with the RFID devices so as to be consistent with the data that sets a collection of properties of RFID devices; and providing a process form, residing on the ERP server, that provides an ERP server based graphical user interface that receives data that sets a collection of properties of RFID devices with which the RFID middleware server is configured to interact; and transmitting to the RFID middleware server the data received by the graphical user interface provided by the process form, wherein transmitting comprises transmitting so as to configured the RFID middleware server to implement RFID processes consistent with the data that sets the collection of properties of RFID processes.

10. The integrated RFID system and ERP system of claim 9, the RFID system further comprising at least one RFID device coupled to the RFID middleware server.

11. The integrated RFID system and ERP system of claim 9, wherein transmitting to the middleware server comprises transmitting from the ERP server to the RFID middleware server using the COM objects on each of the RFID middleware server and the ERP server.

12. The method of claim 1, wherein transmitting from the ERP server computer to the RFID middleware server computer further comprises transmitting using a second COM object on the RFID middleware server computer.

13. The method of claim 1, wherein transmitting said data that identifies and sets properties of the RFID processes comprises transmitting data that identifies and sets a property of a validation process.

14. The method of claim 1, wherein transmitting said data that identifies and sets properties of the RFID processes comprises transmitting data that identifies and sets a property of a business process.

15. The method of claim 1, wherein transmitting said data that identifies and sets properties of the RFID processes comprises transmitting data that identifies and sets a property of a communication process.

* * * * *